United States Patent [19]

Mills

[11] Patent Number: 5,050,302
[45] Date of Patent: Sep. 24, 1991

[54] TOOL FOR SLITTING THE EXTERIOR LAYER OF CYLINDRICAL OBJECTS

[75] Inventor: Gregory A. Mills, Hickory, N.C.
[73] Assignee: Siecor Corporation, Hickory, N.C.
[21] Appl. No.: 661,332
[22] Filed: Feb. 26, 1991
[51] Int. Cl.[5] .............................................. B21F 13/00
[52] U.S. Cl. ...................................... 30/90.8; 30/90.4
[58] Field of Search ....................... 30/90.4, 90.8, 90.9, 30/91.1; 81/9.4, 9.41, 9.43

[56] References Cited

U.S. PATENT DOCUMENTS

| | | | |
|---|---|---|---|
| 2,110,398 | 6/1938 | Edwards et al. | 81/9.42 |
| 4,741,104 | 5/1988 | Noon | 30/90.4 |
| 4,839,986 | 6/1989 | Grantham | 30/90.4 X |
| 4,947,549 | 8/1986 | Genovese et al. | 30/90.8 |

OTHER PUBLICATIONS

"Prazisions-Absetzwerkzeug fur Lichtwellenleiter" Literature Issued by RXS.

Primary Examiner—Douglas D. Watts
Attorney, Agent, or Firm—J. David Abernethy

[57] ABSTRACT

Disclosed is a tool for making precise radial slits in the exterior of a cylindrical object, such as a coated optical waveguide filament. The tool has an interior passage and two blades to make radial slits. The blades are kept from penetrating too far into the interior passage by shims having a calculated thickness dependent on the angle separating the blades and the size of the interior of the object which is to be left uncut.

9 Claims, 4 Drawing Sheets

TOOL FOR SLITTING THE EXTERIOR LAYER OF CYLINDRICAL OBJECTS

BACKGROUND OF THE INVENTION

The field of the invention is slitting tools for cylindrical objects such as filaments.

Slitting and stripping tools have long been used to remove insulation from electrical wire. For example, Edwards et al in U.S. Pat. No. 2,120,398 disclose a cable stripping tool having four knives arranged crosswise around a central passage through which the wire is to be pulled. Coiled springs maintain the blades in a retracted position until use of the blades is desired. A detent is used to adjust blade depth.

Slitting tools have also been used to slit buffer tubes carrying an optical fiber in a gel. For instance, Genovese et al in U.S. Pat. No. 4,947,549, disclose such a tool having opposed but offset blades.

A more recent problem to be solved is the removal of an exterior layer directly applied to an optical fiber. A slitting tool used for such purpose would require an accuracy in the depth of cut to the order of microns or thousandths of an inch. In response to the previous lack of such a tool, the industry has resorted to alternatives such as more easily strippable radiation cured coatings, as shown in U.S. Pat. No. 4,472,021. Still, the development of a more accurate slitting tool would be an advance in the industry.

SUMMARY OF THE INVENTION

Disclosed according to the invention is a slitting tool having the necessary accuracy of cut. A filament, such as a coated optical fiber, is drawn through a cylindrical passage in a frame. Two radially extending blade slits in the frame describe an angle $\phi$ in a plane perpendicular to the passage longitudinal axis whose vertex is on the axis of the cylindrical passage. Each radially extending slit contains a retractable blade parallel to the longitudinal axis of the passage. The depth of penetration of each blade is limited by a shim which is seated in a recess of a blade holder for each blade. The cylindrical passage diameter has a length of between 850 and 1100 micrometers.

Where the angle between the blades is $\phi$, $\theta$ equals $90° - \phi/2$, CR is the length of the cylindrical passage radius, BR is the radius of the entire cylindrical object, and FR is the radius of the interior portion of the cylindrical object which is not to be slit by the blades, the ideal shim thickness was found to be $R \sin \theta - [FR^2 - (R \cos \theta)^2]^{\frac{1}{2}}$, so the actual shim thickness is selected to be within 1% of that value.

In the preferred embodiment, the angular measure of angle $\phi$ is 135°, so the actual angle should be within 25° of the ideal value of 135°.

BRIEF DESCRIPTION OF THE DRAWINGS

The detailed description refers to the drawings, in which.

DETAILED DESCRIPTION OF THE PREFERRED EMBODIMENT

Figure 1:
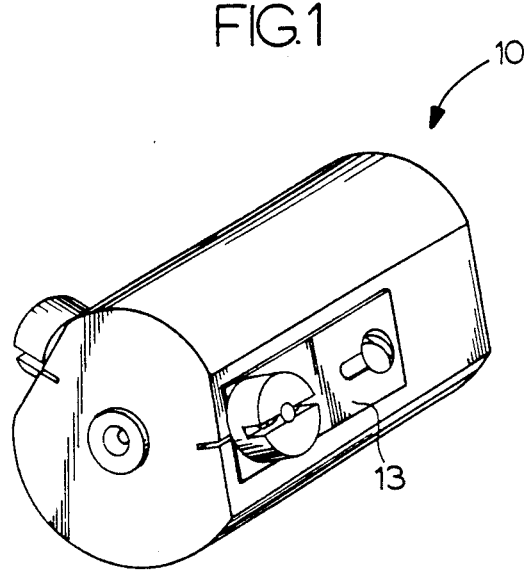
FIG. 1 is perspective view of the slitting tool.
Figure 2:
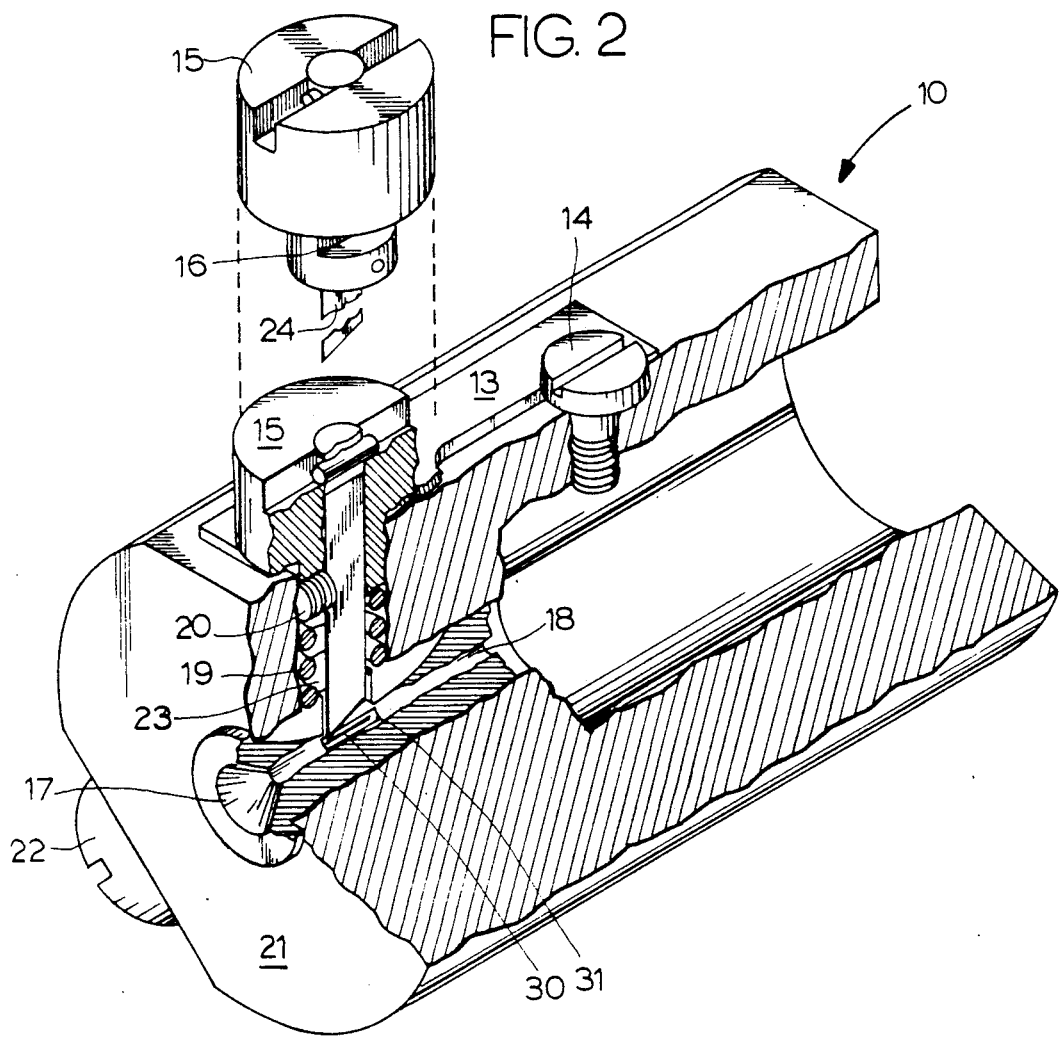
FIG. 2 is an expanded and partial cut-away view of FIG. 1.

Aluminum slitting tool 10, as disclosed in FIGS. 1 and 2, includes cylindrical central passage 18 delimited by frame 21. Passage 18 may be reamed. Brass entrance ways 17 of steadily diminishing inner diameter are provided at either end of passage 18. Two sides of tool 10 are flattened to make handling more convenient.

Blade slots 23, 31 have pressed zirconia blades 30, 24 slideably received therein. The blades are held by brass blade holders 22, 15. The blade holders each have a recess 16 into which steel shims 13 may be inserted. The shims are mounted on the tool by the use of screws 14. Shims 13 are ground to a thickness calculated as described below.

Coiled springs 19 normally maintain blades 30, 24 in a retracted position so that coated optical fibers may be inserted into passage 18 freely. Screws 20 serve to securely seat slitting blades 30, 24 during use.

Figure 3:
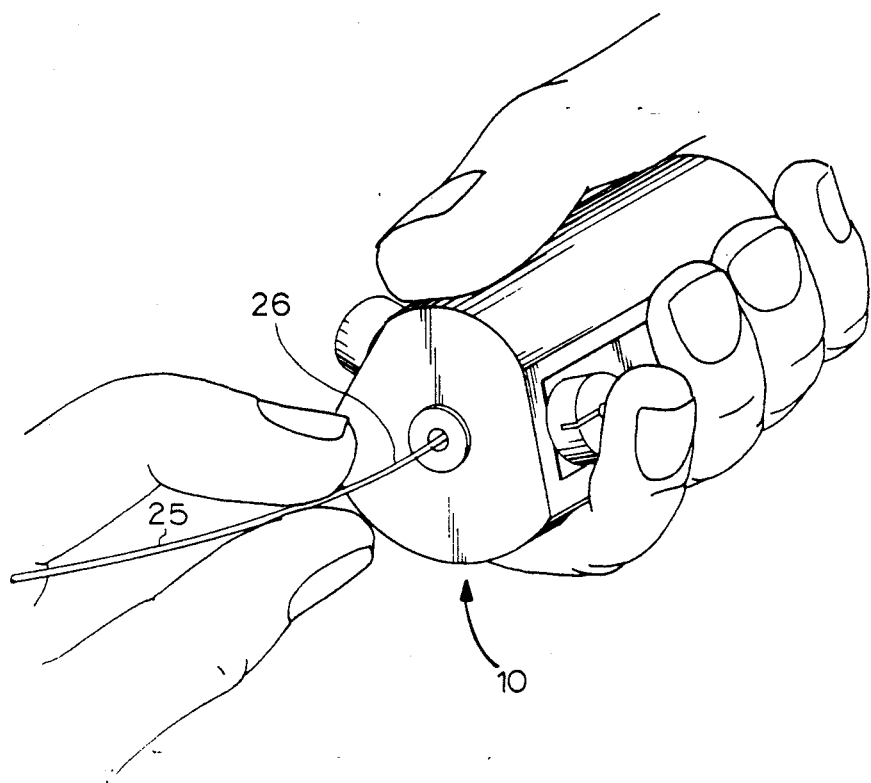
FIG. 3 is a perspective view of the tool during use.
Figure 4:
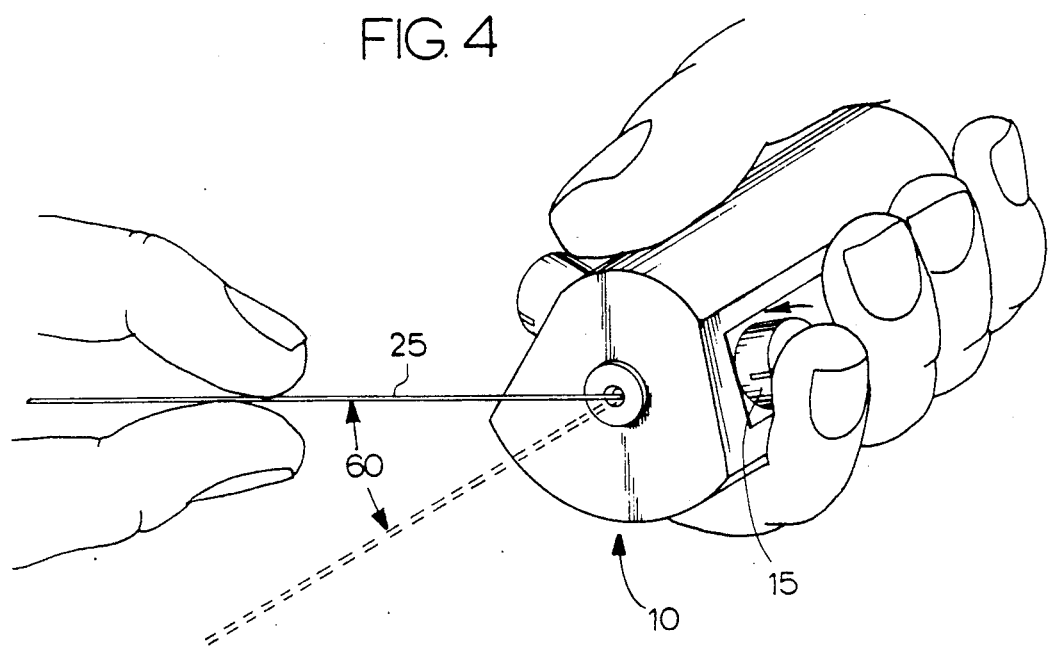
FIG. 4 is another perspective view of the tool during use.
Figure 5:
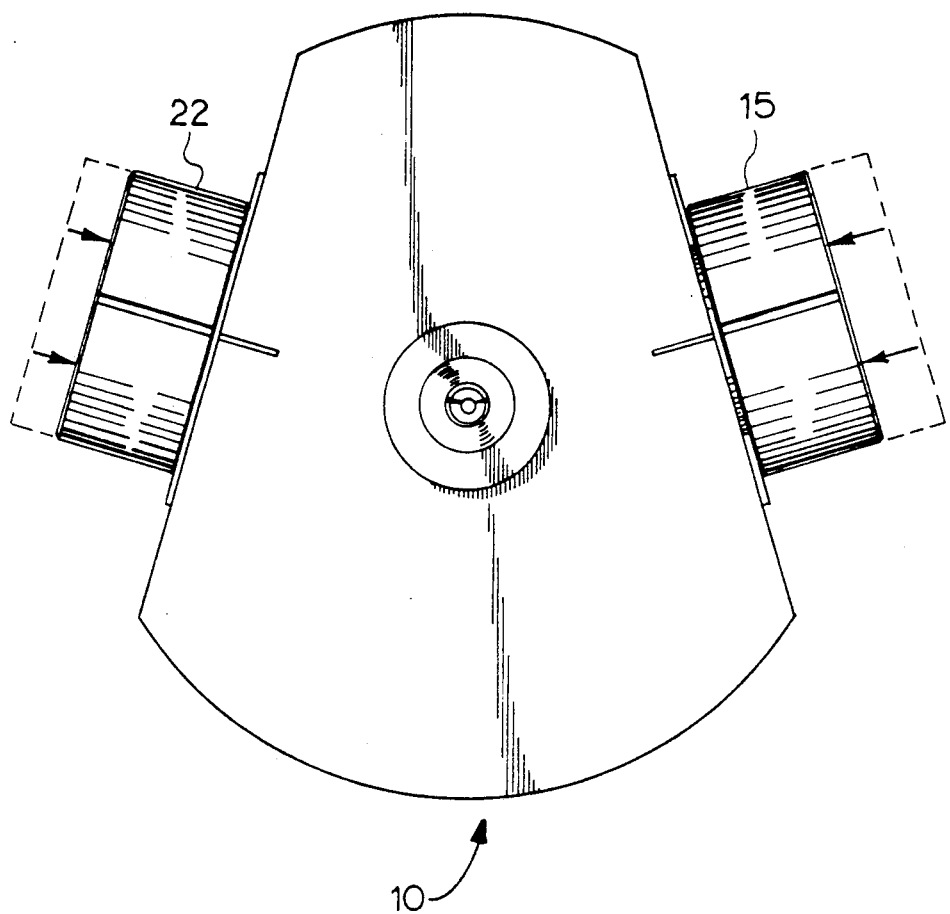
FIG. 5 is an end view of the tool.

In order to strip a buffer layer 12 from optical fiber 25 during use, a mark 26 as shown in FIG. 3 is first made on optical fiber 25 to designate the length of the fiber which is desired to be stripped. Optical fiber 25 is then inserted into the tool until mark 26 is at the front of the tool. At this point, one of the aluminum buttons of blade holders 15, 22 is depressed and optical fiber 25 is pulled gently through the tool until optical fiber 25 is free of the tool. The button is to be depressed tightly and a smooth continuous motion is to be used. As illustrated in FIG. 4, an angle of 60° between the optical fiber and the axis of the tool is seen to help assure an effective cut. The optical fiber is then reinserted, and both buttons are depressed, as shown in FIG. 5. The optical fiber is then pulled through the tool again. Cuts should now have been made in buffer tube 12, and one or more slivers of buffer material 12 should be present along the portion of optical fiber 25 pulled through the tool.

Figure 6:
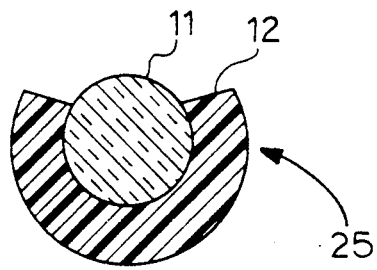
FIG. 6 is a sectional view of an optical fiber with a portion of its coating having been cut away by the tool; and, FIG. 7 is a diagrammatic sectional view of an optical fiber in the tool passage illustrating the various angles and distances referred to in the specification and claims.

The strip of buffer 12 which has been slit can then be removed by hand, leaving optical fiber 25 in the condition shown in FIG. 6. The remainder of the optical fiber buffer 12 can then be removed manually as well. The use of a protective cover such as a finger cup, or cot, is recommended during this removal process.

When blade replacement is desired, a shim screw 14 may be loosened, shim 13 may be slid away from the blade holder button, and the blade holder and spring 19 can then be lifted out of the tool. Set screw 20 is then removed with a hex wrench to loosen the slitting blade in its seat. A new blade can then be inserted and the process can be reversed to insert the new blade.

When a new blade is reinserted, the blade holder button should be depressed until the blade tip bottoms out on the opposite side of interior passage 18. While the blade is held in that position within the blade holder, the blade holder is removed and the set screw 20 is tightened to reseat the slitting blade. Spring 19 may then be reinserted in the tool, and the blade holder is reinserted until recess 16 is even with shim 13. The shim is then slid back inside recess 16 and shim screw 14 is then retightened. Thus, the blade is now spaced apart from the opposite wall of passage 18 by a distance equal to the shim thickness. Use of the tool is then recommended first on a piece of scrap fiber to make sure that the tool is again working properly.

Figure 7:
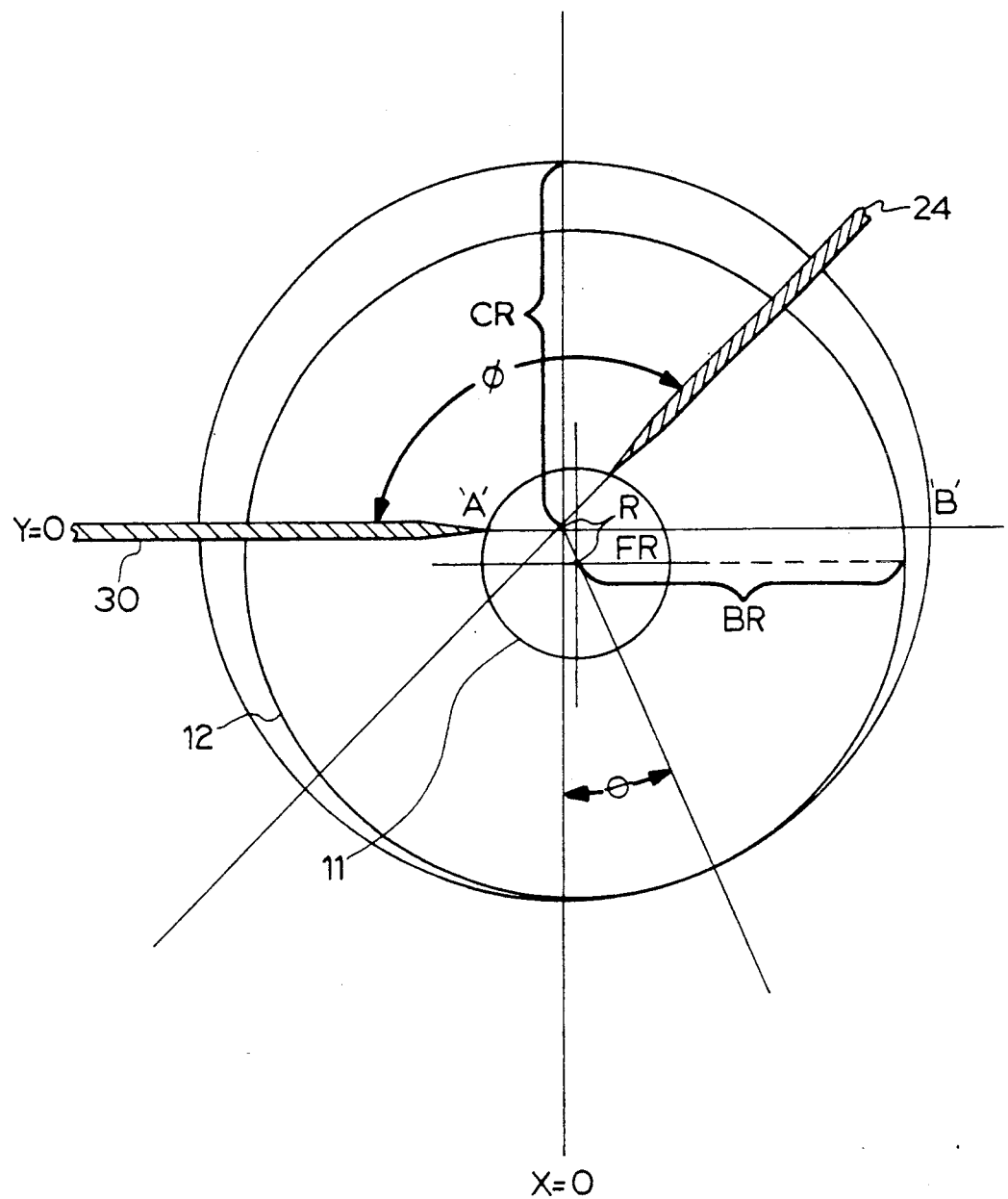

FIG. 7 is now referred to for the explanation of how shim thickness 13 is to be calculated.

In FIG. 7, the origin of an X-Y axis is shown at the center of the cylindrical passage 18. The radius of the cylindrical passage is shown as CR. The cylindrical passage diameter CD is CR times two. Optical fiber interior Section 11 having buffer layer 12 is shown within the cylindrical passage. The center of the optical fiber is shown at a distance R and angle $\theta$ from the center of the cylindrical passage, $\theta$ being measured from the vertical axis through the center of the cylindrical passage. The radius of center portion 11 is FR and the radius of buffer layer 12 is BR, as measured from the center of interior portion 11.

During slicing, it is observed that the optical fiber moves away from the center of the cylindrical passage along a line which is opposite the bisector of angle $\phi$ between blades 30 and 24. Angle $\theta$ is a vertical angle with the complement of $\phi$ divided by 2 so $\theta = 90° - \phi/2$.

The shim thickness is equal to the distance between points A and B in FIG. 7. Since the center of optical fiber 11 is offset from the X-Y origin by $X' = R \sin \theta$ and $Y' = -R \cos \theta$, the equation for the outer portion of optical fiber 11 is given by $FR^2 = (X - R \sin \theta)^2 + (Y + R \cos \theta)^2$. The coordinates of point A in FIG. 7 must be given by this equation where $Y = 0$. From FIG. 7, $R = CR - BR$. Solving, $X = R \sin \theta \pm [FR^2 - (R \cos \theta)^2]^{\frac{1}{2}}$. Substituting the values $\phi = 135°$, FR = 125 microns, $\theta = 90 - 135/2 = 22.5°$, CD = 970 microns, BD = 900 microns, $R = \frac{1}{2} (CD - BD) = 35$ microns, where CD = 2 CR and BD = 2 BR, then $X = 35 \sin 22.5° \pm [125^2 - (35 \cos 22.5)^2]^{\frac{1}{2}}$. Taking the negative root since Point A is to the left of the origin, $X = X_A = -107.35$ microns. $X_B = CR = 485$ microns. The shim thickness is the absolute value of $X_B$+the absolute value of $X_A = 592.35$ microns = 23.3 mils. The shim thickness for each shim is the same due to symmetry. Repeating the calculation for BD = 850 microns, the shim thickness is 574.08 microns = 22.6 mils. If both types of optical fibers are used, the shim thickness is selected at 23.0 mils, which proves to be acceptable during actual use.

To allow for buffered optical fibers of varying thickness, the diameter of passage 18 should be between 850 and 1100 micrometers, since coated optical waveguides to be slit will have a diameter no more than 1100 micrometers.

The ideal angle $\phi$ at which the blades are spaced apart is 135°. Superior results will be achieved if $\phi$ is within 25 degrees of 135°. The 135° blade angle is found to be superior than either diametrically opposing blades or a single blade. In the preferred embodiment, two coplaner blades are used though the use of longitudinally offset blades or the use of a third blade between the first two blades are alternatives.

What is claimed is:

1. A tool for slitting an exterior layer of a cylindrical object, comprising:
    (a) a frame having a cylindrical passage therein having a longitudinal axis and a cylindrical passage radius CR, and two radially extending blade slots in communication with said cylindrical passage, said blade slots separated by an angle $\phi$ whose vertex is on said longitudinal axis with respect to a plane perpendicular to said longitudinal axis;
    (b) a blade slideably received in each blade slot; and,
    (c) a shim on said frame limiting penetration of a blade into its blade slot.

2. A tool as recited in claim 1, further comprising:
    (a) a blade holder for each blade, each blade holder having a recess therein into which a shim may be inserted.

3. A tool as recited in claim 2, wherein the diameter of the cylindrical passage has a length of between 850 and 1100 micrometers.

4. A tool for slitting an exterior layer of a cylindrical object, comprising:
    (a) a frame having a cylindrical passage therein having a longitudinal axis and a cylindrical passage radius CR, and two radially extending blade slots in communication with said cylindrical passage, said blade slots separated by an angle $\phi$ whose vertex is on said longitudinal axis with respect to a plane perpendicular to said longitudinal axis;
    (b) a blade slideably received in each blade slot; and,
    (c) a shim on said frame limiting penetration of a blade into its blade slot, said shim having a thickness within one percent of the value R Sin $\theta - [FR^2 - (R \cos \theta)^2]^{\frac{1}{2}}$, where $R = CR - BR$, BR is the radius of the cylindrical object, FR is the radius of the interior portion of the cylindrical object which is not to be slit by the blades, and $\theta = 90° - \phi/2$.

5. A tool as recited in claim 4, further comprising a blade holder for each blade, each blade holder having a recess therein into which a shim may be inserted.

6. A tool as recited in claim 5, wherein the cylindrical passage diameter has a length of between 850 and 1100 micrometers.

7. A tool as recited in claim 6, further comprising a cylindrical object to be slit which is a filament having a diameter of no more than 1100 micrometers.

8. A tool as recited in claim 7, wherein the filament is a coated optical waveguide.

9. A tool as recited in claim 6 wherein the angular measure of angle $\phi$ is 135°±25°.

* * * * *